United States Patent
Russakoff et al.

(10) Patent No.: US 10,586,387 B2
(45) Date of Patent: Mar. 10, 2020

(54) METHOD AND APPARATUS FOR GENERATION OR EDITING OF LAYER DELINEATIONS

(71) Applicant: Voxeleron LLC, Pleasanton, CA (US)

(72) Inventors: Daniel Benjamin Russakoff, San Francisco, CA (US); Jonathan David Oakley, Pleasanton, CA (US)

(*) Notice: Subject to any disclaimer, the term of this patent is extended or adjusted under 35 U.S.C. 154(b) by 148 days.

(21) Appl. No.: 15/492,165

(22) Filed: Apr. 20, 2017

(65) Prior Publication Data
US 2017/0309080 A1    Oct. 26, 2017

Related U.S. Application Data

(60) Provisional application No. 62/325,411, filed on Apr. 20, 2016.

(51) Int. Cl.
G06T 19/00    (2011.01)

(52) U.S. Cl.
CPC .......... *G06T 19/00* (2013.01); *G06T 2210/41* (2013.01); *G06T 2219/008* (2013.01); *G06T 2219/028* (2013.01)

(58) Field of Classification Search
CPC .............. G06T 19/00; G06T 2219/028; G06T 2219/008; G06T 2210/41
See application file for complete search history.

(56) References Cited

U.S. PATENT DOCUMENTS

| | | | |
|---|---|---|---|
| 2005/0231530 A1* | 10/2005 | Liang | G06T 19/00 345/619 |
| 2007/0103693 A1* | 5/2007 | Everett | G06T 19/00 356/479 |
| 2011/0285702 A1* | 11/2011 | Hautvast | G06T 7/0012 345/419 |

OTHER PUBLICATIONS

"Validation of Macular Choroidal Thickness Measurements from Automated SD-OCT Image Segmentation" by Twa et al., Optometry and Vision Science, vol. 93, No. 11, Nov. 2016 (12 pages).

* cited by examiner

*Primary Examiner* — Pinalben Patel
(74) *Attorney, Agent, or Firm* — Ellenoff Grossman & Schole LLP; James M. Smedley; Alex Korona

(57) ABSTRACT

Methods are disclosed for the generation and editing of layer delineations within three-dimensional tomography scans. Cross sections of a subject are generated and presented to an operator, who has the ability to edit layer delineations within the cross section, or determine parameters used to generate new cross sections. By guiding an operator through a set of displayed cross sections, the methods can allow for a more rapid, efficient, and error-free segmentation of the subject. The cross sections can be nonplanar in shape or planar and non-axis-aligned. The cross sections can be restricted to exclude one or more user-defined regions of the subject, or to include only one or more user-defined regions of the subject. The cross sections can be localized to a point-of-interest. Iterative implementations of the methods can be used to arrive at a segmentation deemed satisfactory by the user.

13 Claims, 10 Drawing Sheets

METHOD AND APPARATUS FOR GENERATION OR EDITING OF LAYER DELINEATIONS

CROSS-REFERENCES TO RELATED APPLICATIONS

This application claims the benefit of U.S. Provisional Application No. 62/325,411, filed on Apr. 20, 2016 which is hereby incorporated by reference in its entirety.

FIELD OF THE INVENTION

The present invention generally related to methods and systems for the generation and editing of layer delineations within three-dimensional tomography scans. In preferred embodiments, cross sections of a subject are generated and presented to an operator, who has the ability to edit layer delineations within the cross section, or determine parameters used to generate new cross sections. The cross sections can be planar nonplanar in shape or axis or non-axis-aligned. The cross sections can be restricted to exclude one or more user-defined regions of the subject, or to include only one or more user-defined regions of the subject. The cross sections can be localized to a point-of-interest. Iterative implementations of the methods can be used to arrive at a delineation deemed satisfactory by the user.

BACKGROUND

Optical coherence tomography (OCT) is a well-established medical imaging technique used to create three-dimensional (3D) images of, for example, the retina. Analysis of images recorded using OCT can delineate the layers of the retina through a procedure referred to as retinal layer segmentation. Such technologies are used clinically to determine variations in the relative thickness of certain retinal layers, as these thicknesses have been shown to relate to various pathologies. In many cases, a choice of treatment can depend in part on parameters such as retinal layer thicknesses. As the eye is an extension of the central nervous system, technologies associated with the imaging and delineation of retinal layers have medical uses beyond those limited to the detection and management of ocular pathologies.

Advanced stage ocular diseases tend to severely disrupt the normal architecture of the retina, which can increase the likelihood of failure for automated algorithms used for retinal layers segmentation. In such cases, however, the retinal structure and its response to treatment still needs to be accurately assessed. This can require input from an operator, such as a researcher or clinician, to edit pre-existing layer delineations, or to generate entirely new layer delineations. Editing of layers is done based on repeatedly working with two-dimensional (2D) images extracted from the 3D volumes. The efficiency of methods for generating and editing these layer delineations can significantly impact their utility and robustness.

BRIEF SUMMARY

In general, provided herein are methods for determining biological layer structure in a three-dimensional (3D) tomography scan. One provided method comprises rendering a first two-dimensional (2D) image using a computer. The first 2D image is produced from a 3D tomographic model using the computer. The 3D tomographic model represents a subject having an x-axis, a y-axis, and a z-axis. The first 2D image represents a first cross section of the subject. The first cross section is the intersection of the subject and a first surface. The first surface is parallel to the z-axis. The method further comprises displaying the first 2D image using the computer. The method further comprises recording operator input of a first delineation of one or more layers within the displayed first 2D image using the computer. The method further comprises relating the first delineation with a first layer of the one or more layers using the computer. The method further comprises rendering a second 2D image produced from the 3D model using the computer. The second 2D image represents a second cross-section of the subject. The second cross section is the intersection of the subject and a second surface. The second surface is either (i) a nonplanar surface, wherein the nonplanar surface is parallel to the z-axis; or (ii) a planar surface, wherein the planar surface is parallel to the z-axis, and wherein the planar surface is not parallel to any plane comprising (a) the z-axis and (b) either the x-axis or the y-axis. The method further comprises displaying the second 2D image using the computer. The method further comprises recording operator input of a second delineation of one or more layers within the displayed second 2D image using the computer. The method further comprises associating the second delineation with the first layer using the computer. The method further comprises generating layer data for the 3D tomographic model by interpolating the first and second delineations using the computer. The method further comprises outputting layer data for the 3D tomographic model using the computer.

In some embodiments, the method further comprises rendering a third 2D image produced from the 3D tomographic model using the computer. The third 2D image represents a third cross section of the subject. The method further comprises computing a third delineation of one or more layers within the displayed third 2D image using the computer. The method further comprises displaying the third 2D image and the third delineation of layers using the computer. The method further comprises accepting operator input editing the third delineation of layers using the computer, thereby generating an edited third delineation of layers. The method further comprises associating the edited third delineation with the first layer using the computer. The method further comprises generating layer data for the 3D tomographic model by interpolating the first and second delineations and the edited third delineation using the computer.

In some embodiments, the second surface is a planar surface. The planar surface is parallel to the z-axis of the subject. The planar surface is not parallel to any plane comprising (a) the z-axis of the subject and (b) either the x-axis or the y-axis of the subject.

In some embodiments, the second surface is a nonplanar surface. The nonplanar surface consists of each line parallel to the z-axis of the subject and passing through a first path in an x-y plane of the subject. The x-y plane of the subject comprises the x-axis and the y-axis of the subject. In some embodiments, the first path in the x-y plane of the subject is a circle.

In some embodiments, the generating of layer data is through the use of a scattered point interpolation algorithm.

In some embodiments, the 3D tomographic model is produced from two or more tomographic images. In some embodiments, the tomographic images are optical coherence tomography images. In some embodiments, the subject is a retina. In some embodiments, the delineation of one or more layers is a retinal layer segmentation.

In some embodiments, the method further comprises rendering a third 2D image produced from the 3D tomographic model using the computer. The third 2D image represents a third cross section of the subject. The third cross section is the intersection of the subject and a third surface. The third surface consists of each line parallel to the z-axis of the subject and passing through a second path in the x-y plane of the subject. The method further comprises displaying the third 2D image using the computer. The method further comprises recording operator input of a third delineation of one or more layers within the displayed third 2D image using the computer. The method further comprises associating the third delineation with the first layer using the computer. The method further comprises generating layer data for the 3D tomographic model by interpolating the first, second, and third delineations using the computer.

In some embodiments, the method further comprises accepting operator input defining a second path in the x-y plane of the subject using the computer. The method further comprises rendering a third 2D image produced from the 3D tomographic model using the computer. The third 2D image represents a third cross section of the subject. The third cross section is the intersection of the subject and a third surface. The third surface consists of each line parallel to the z-axis of the subject and passing through the second path in the x-y plane of the subject. The method further comprises displaying the third 2D image using the computer. The method further comprises recording operator input of a third delineation of one or more layers within the displayed third 2D image using the computer. The method further comprises associating the third delineation with the first layer using the computer. The method further comprises generating layer data for the 3D tomographic model by interpolating the first, second and third delineations using the computer.

In some embodiments, the method further comprises determining a series of confidence values using the computer. Each confidence value is assigned to a predetermined point in the x-y plane of the subject. The method further comprises defining the second path in the x-y plane of the subject using the computer. The second path is selected to comprise points in the x-y plane having a mean or minimum confidence value below a target value.

In some embodiments, the confidence value assigned to each predetermined point is a function of the minimum distance between the predetermined point and the first or second cross section. In some embodiments, the confidence value assigned to each predetermined point is a function of the output of an edge detection algorithm comparing data from the 3D tomographic model at that predetermined point with data from the 3D tomographic model at an adjacent predetermined point.

In some embodiments, the method further comprises collecting operator input labeling zero, one, or more regions in the x-y plane of the subject as desired using the computer. The method further comprises collecting operator input using the computer labeling zero, one, or more regions in the x-y plane of the subject as undesired using the computer. The second path is selected to consist of points within any regions labeled as desired, or the second path is selected to consist of points outside any regions labeled as undesired.

In some embodiments, the method further comprises accepting operator input defining a point-of-interest in the x-y plane of the subject using the computer. The method further comprises defining a second path in the x-y plane of the subject using the computer. The second path is selected to comprise and center about the point-of-interest. The method further comprises rendering a third 2D image produced from the 3D tomographic model using the computer. The third 2D image represents a third cross section of the subject. The third cross section is the intersection of the subject and a third surface The third surface consists of each line parallel to the z-axis of the subject and passing through the second path in the x-y plane of the subject. The method further comprises displaying the third 2D image using the computer. The method further comprises recording operator input of a third delineation of one or more layers within the displayed third 2D image using the computer. The method further comprises associating the third delineation with the first layer using the computer. The method further comprises generating layer data for the 3D tomographic model by interpolating the first, second, and third delineations using the computer.

In some embodiments, the second path traces a spiral shape. In some embodiments, the second path traces a multi-arm star shape. In still further embodiments, the second path traces could be one or more other geometric patterns.

Also provided is a method of determining biological layer structure in a 3D tomography scan comprising rendering a 2D image produced from a 3D tomographic model using a computer. The 3D tomographic model represents a subject. The 2D image represents a cross section of the subject. The cross section is the intersection of the subject and a nonplanar surface. The method further comprises displaying the 2D image using the computer. The method further comprises recording operator input of a delineation of one or more layers within the displayed 2D image using the computer. The computer further comprises relating the delineation with a first layer of the one or more layers using the computer.

DETAILED DESCRIPTION

A method of determining biological layer structure in a three-dimensional (3D) tomography scan is described. The method can be used in a workflow that increases the speed and efficiency of editing pre-existing layer delineations or generating new layer delineations.

For the purposes of this detailed description, editing may broadly defined to include activities relating to the changing and creating of layer boundaries as rendered along with the image data in accordance with embodiments of the present invention. Editing can further mean the adjustment of an existing layer, deletion, addition, cutting, pasting, cropping, merging or combining of layers, moving of layers, or any combination thereof. Editing may be generally relative to the image data and positions created via the planar- or non-planar and axis- or non-axis-aligned surfaces. One of ordinary skill in the art would appreciate that there are numerous types of editing that could be accomplished through embodiments of the present invention, and embodiments of the present invention are contemplated for use with any appropriate forms of editing.

Severe ocular diseases can result in disrupted retinas, yet clinical end points require accurate measurements of structure, which in some cases requires manual intervention. Furthermore, due to the high average age of patients suffering from neurodegenerative diseases, structural analyses of atrophying neuronal layers is often complicated by other ocular diseases common in this aging population. In many such cases, only expert interpretation can tease out accurate parameters and biomarkers from the data. These manual review and edits resulting in new layer delineations, however, are currently extremely laborious (~2 hours per scan).

Figure 1:
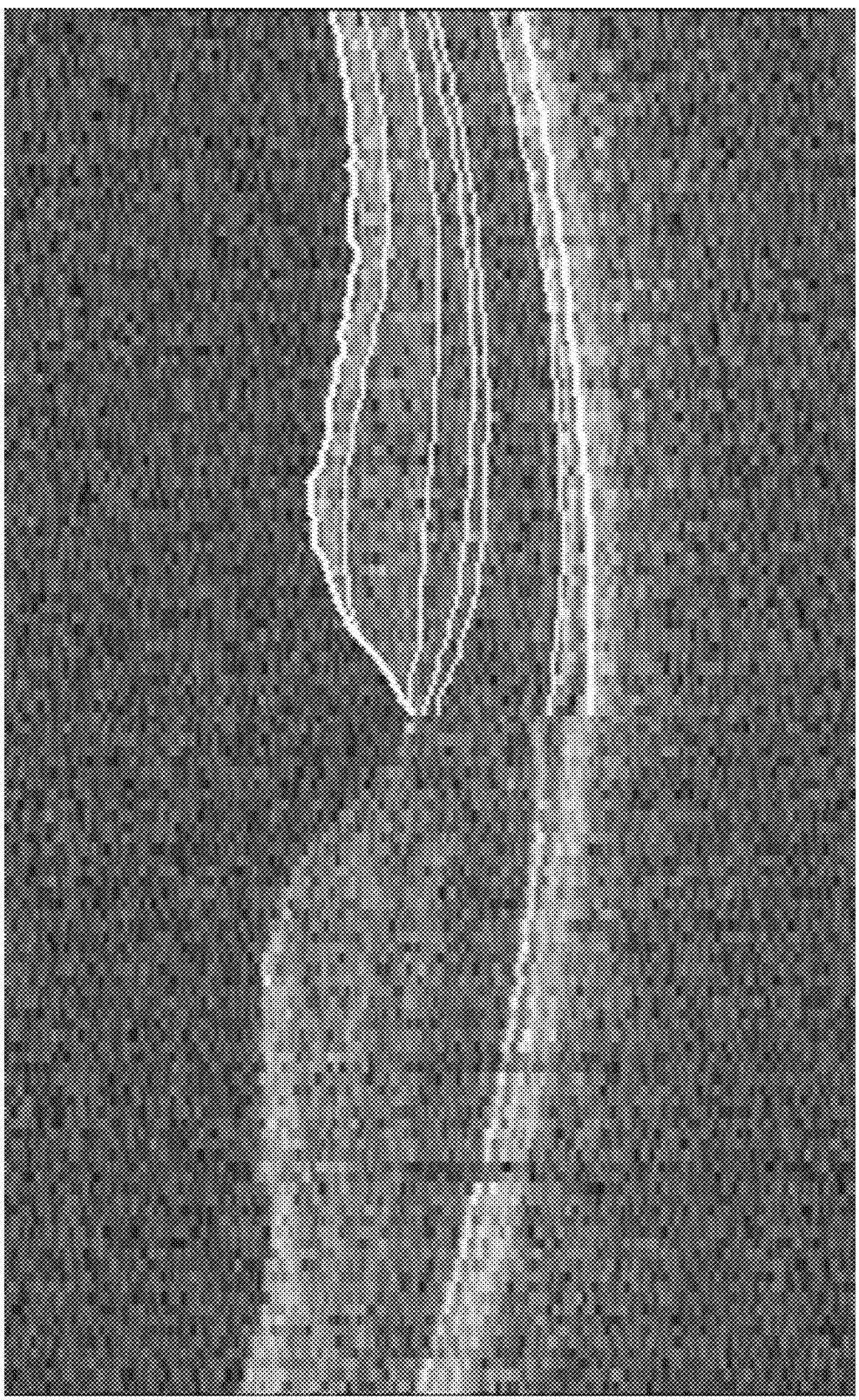
FIG. 1 illustrates a rendered OCT image and retinal layer delineation in accordance with an embodiment.

FIG. 1 shows an optical coherence tomography (OCT) image of the human retina. On the right-hand side of FIG. 1 is shown delineation of layers of retina derived using a fully automated segmentation algorithm (retinal layer segmentation). Previously disclosed methods for correcting layer segmentations such as those shown in FIG. 1 involve editing in a "slice-by-slice basis" along one of the x-axis or y-axis of the biological sample. If a large portion of the delineated layer is incorrect, it can take a very long time to edit the entire layer. This slice-by-slice editing can suffer from being time-consuming and labor-intensive, requiring an average of 2 hours per scan to complete.

The workflows disclosed herein can guide users through a set of canonical segmentations via a "wizard"-like interface. These segmentations can require many fewer manual edits and help the user arrive at a layer delineation much more quickly.

Figure 2:
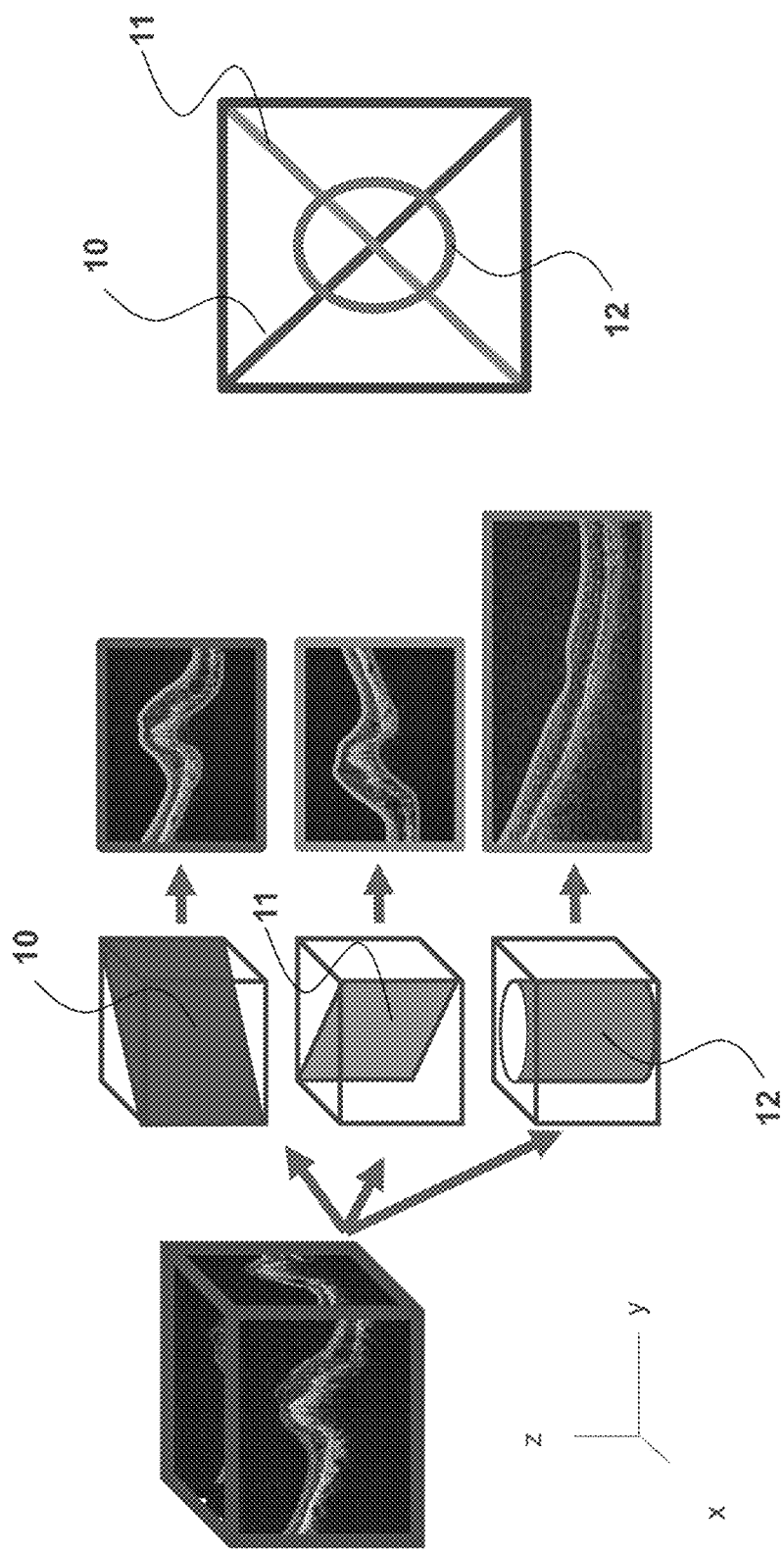
FIG. 2 illustrates cross sections (i.e., surfaces) of a subject in accordance with an embodiment.

FIG. 2 illustrates cross sections, or slices, of a subject in accordance with an embodiment. Shown in FIG. 2 is a biological sample having an x-axis, a y-axis, and a z-axis. The z-axis is typically defined to be the direction from the sample to the tomographic imager. In this way, the z-direction typically relates to depth within the sample, with an x-y plane being perpendicular to this z-axis. Also shown are three cross sections of the subject (10, 11, 12). The first 10 and second 11 cross sections are formed from intersections of the sample with surfaces that are planar and non-axis-aligned. The third cross 12 section is formed from the intersection of the sample with a surface that is nonplanar. Also shown is a "top-down" view of the cross sections, showing the paths that the cross sections trace in the x-y plane of the sample.

In some embodiments, the user is prompted to manually segment a specific set of predefined slices of a 3D tomographic model representing the subject. The slices can be chosen to optimize coverage with minimal user interaction. This coverage can be optimized by minimizing the maximum, mean, or total distance from an arbitrary location to a predefined slice. This coverage can be optimized by minimizing the maximum, mean, or total distance from all "low confidence" locations. Low-confidence locations can be defined as locations having layer segmentations deemed less likely to be correct. This coverage can be optimized by using pre-defined slices that partition the sample into separate zones. The zones can be optimized to minimize the maximum or mean area.

Figure 3:
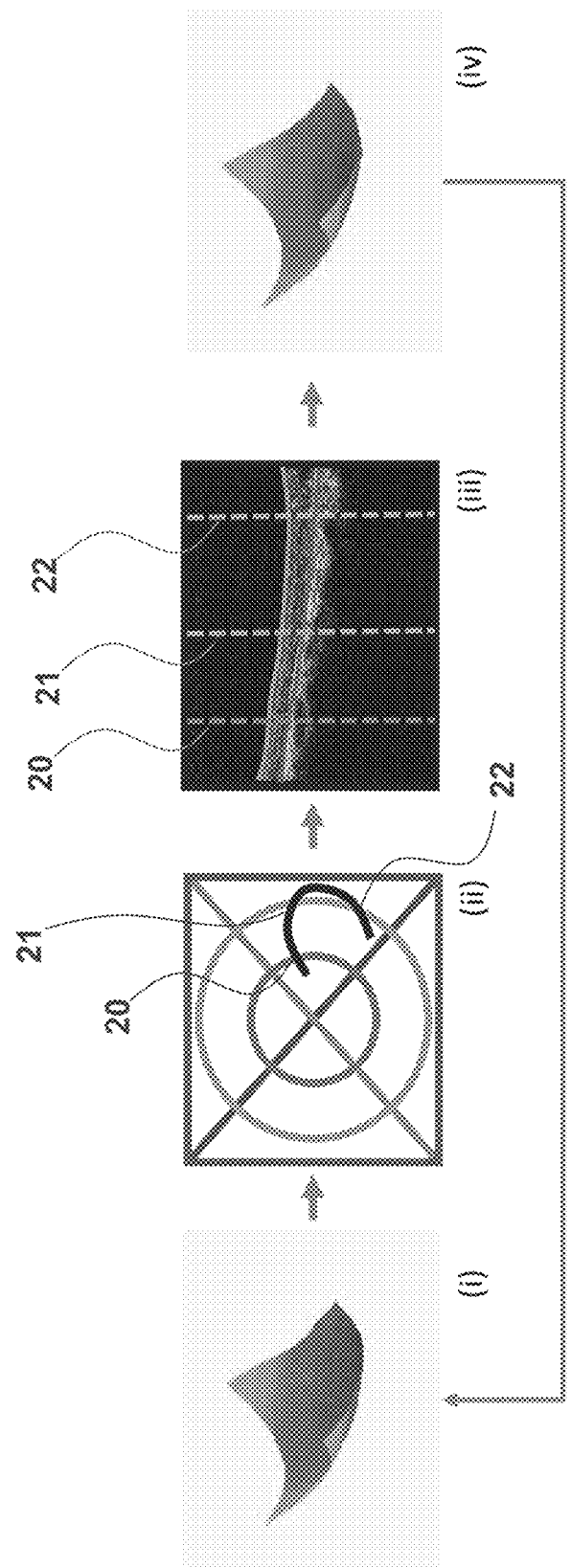
FIG. 3 illustrates an iterative workflow in accordance with an embodiment.

FIG. 3 illustrates an iterative workflow in accordance with an embodiment. In step (i) of the workflow of FIG. 3, software generates a new layer based an operator's delineations of the predefined slices. In step (ii) of the workflow of FIG. 3, the operator draws a continuous curve (depicted here passing through a first cross section at 20, a second cross section at 21, and back through the second cross section at 22) through an area or areas that need more accurate segmentations. Alternatively, the algorithm itself can suggest a curve or continuous set of x,y positions based on a number of criteria. The curve can be suggested to cover a region with the highest likelihood of error. The curve can be suggested to minimize the maximum, mean, or total distance from an arbitrary point to an edited slice. The curve can be suggested to minimize the maximum, mean, or total distance from any low-confidence point to an edited slice. In step (iii) of the workflow of FIG. 3, a slice corresponding to this curve is generated through the volume and the current layer delineation is displayed (note that in this exemplary embodiment, the slice generated unwraps the operator's curve, thereby passing again through the smaller circular cross section at 20 and the larger circular cross section at 21 and at 22). The user can then be prompted to either edit the current layer delineation or generate a new one. After the user is finished editing the layer delineation of the slice, a new segmentation is generated in step (iv) of the workflow of FIG. 3. The workflow can iterate until a user is satisfied with the full segmentation.

Areas of "low confidence" can be derived from a likelihood map that would characterize the correctness or consistency of the remaining segmentation locations. The likelihood map can have large values at locations where there is a good chance the current layers are incorrect. The likelihood map can be generated with the formula:

$$L(x,y)=N(x,y)/C(x,y)$$

where $N(x,y)$ represents the proximity of location x,y to an existing user edit (i.e., the closer a point is to a user edit, the more likely is s to be correct). $C(x,y)$ represents the confidence in the automated segmentation value. A high confidence can indicate a low likelihood for editing. $C(x,y)$ can be calculated in a number of ways. C values can depend on similarity to neighboring manually segmented areas. C values can depend on overall edge strength.

Additionally, and at any stage, the user can be able to explicitly designate "don't care" regions that will be essentially masked from all consideration and influence from the remaining, implicitly defined "do care" regions. This can be necessary in cases involving regions of extremely low signal. These can result, for example, from opacities in the eye preventing any light reaching certain areas of the retina. In such cases an editing wizard can otherwise continually return to these areas that are not of interest. Also, it is preferred that such poor data not influence data related to neighboring areas. This designation of "don't care" regions can provide a mechanism to ensure that this is not the case.

In some embodiments, by default all the data is initially designated a "do care" region. Once editing is completed, the user can still segment the "don't care" regions outlined. The results from neighboring areas can be used to complete the segmentation (either by simple interpolation or by explicit segmentation).

Figure 4:
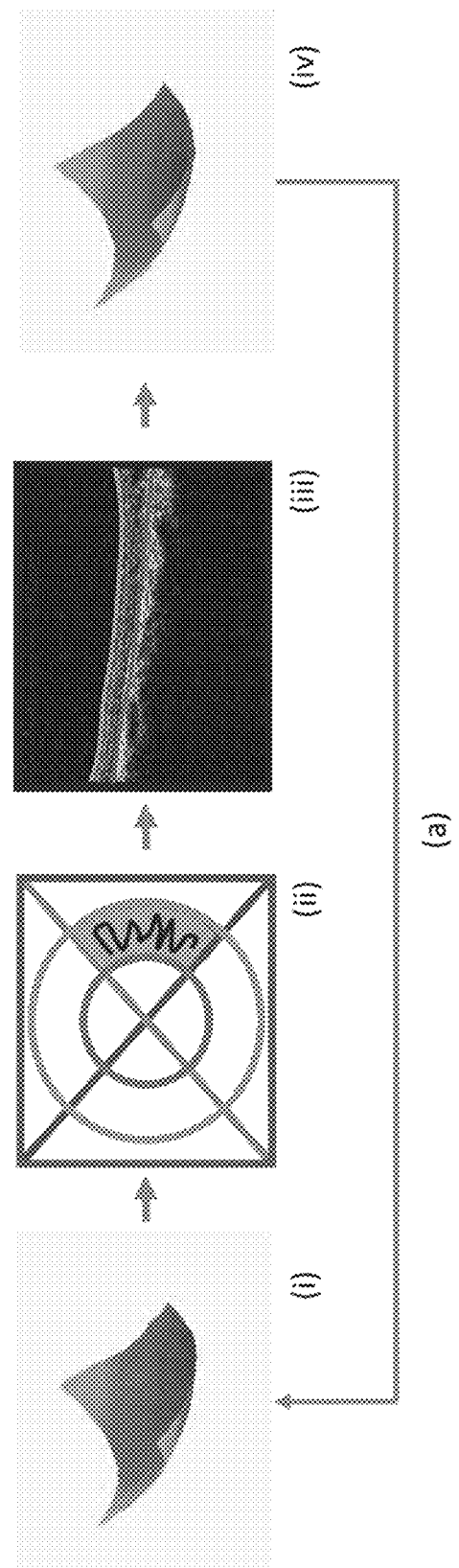
FIG. 4 illustrates a zone-based workflow in accordance with an embodiment.

FIG. 4 illustrates a zone-based workflow in accordance with an embodiment. In step (i) of the workflow of FIG. 4, the software generates a new segmentation based on a user's delineations of pre-defined slices. In step (ii) of the workflow of FIG. 4, the user selects a zone that needs editing, where each zone is an area bounded by pre-defined slices. A slice corresponding to a curve that covers the zone is generated through the volume, and the current layer delineation for that slice is displayed in step (iii) of the workflow of FIG. 4. The user is then prompted to either edit this current layer delineation or to generate a new one. When the user is finished editing the layer delineation of the current slice, a new segmentation is generated in step (iv) of FIG. 4. The user can iterate over the zones until satisfied with the full segmentation.

The provided methods can also be used for the editing of layer delineations of very specific regions through a spot fixing technique. A number of ocular pathologies, such as drusen or holes, tend to be circularly symmetrical. The ability to select a spot on an image, position a set of crosshairs centered at the spot, and vary the size and density of the crosshairs can increase the efficiency of editing such circularly symmetrical spots.

Figure 5:
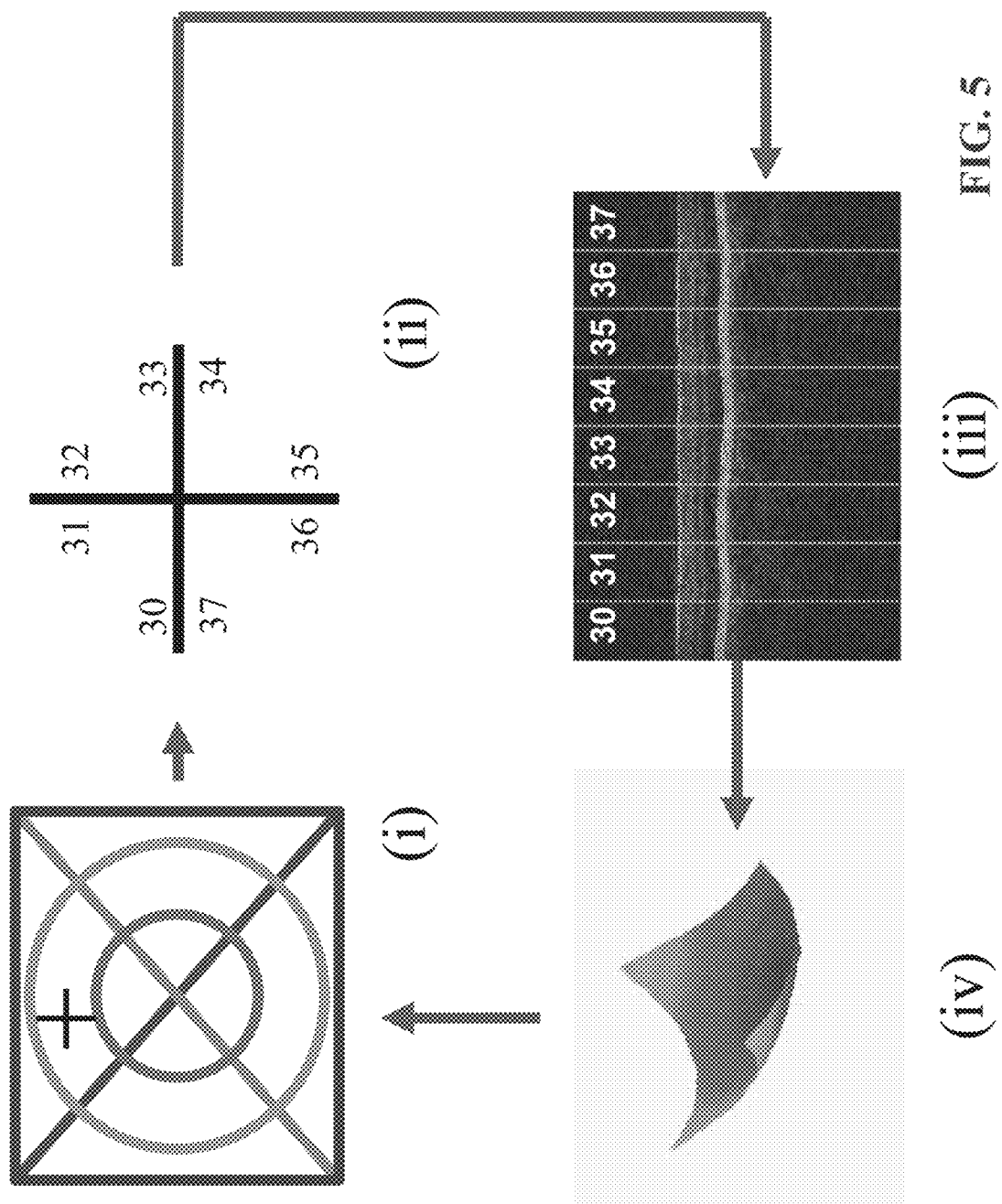
FIG. 5 illustrates an exemplary embodiment of a method for generation or editing of layer delineations, in accordance with an embodiment of the present invention.

FIG. 5 illustrates a spot-based workflow in accordance with an embodiment. In step (i) of the workflow of FIG. 5, the software generates a new segmentation based on a user's delineations of pre-defined slices, and the user places a set of crosshairs or a multi-armed star on a region specified as needing editing. The crosshairs or multi-arm star can have any size or density, where the density of the shape is defined as the number of arms of the shape. For example, a plus sign is a shape with four arms as shown in FIG. 5. A path is then defined as in step (ii) of FIG. 5 as the walking of the boundary of the crosshairs. A slice corresponding to this walking path is generated through the volume of the sample, and the current delineation associated with this slice is displayed in step (iii) of FIG. 5. The user is then prompted to either edit this current layer or generate a new one. When the user is finished editing the layer delineation, a new segmentation is generated in step (iv) of FIG. 5. The user can iterate this process over the same or other zones until satisfied with the full segmentation.

In some embodiments, the generation of layer data is through re-segmentation using the user's delineations as input data. The re-segmentation can be accomplished by interpolation. Interpolations performed as part of the workflows can be carried out using, for instance, a scattered point interpolation algorithm. According to an embodiment of the present invention, the scattered point interpolation algorithm can be used to generate a set of interpolated layer segmentation values based on a set of pre-determined or user-defined layer delineations. The interpolations can be carried out using, for instance, a spline interpolation algorithm. According to an embodiment of the present invention, the spline interpolation algorithm can be used to generate piecewise polynomials between pre-determined or user-defined layer delineation values. According to an embodiment of the present invention, the interpolation could also be carried out via Shephard interpolation, Natural Neighbor interpolation, Wiener interpolation, Poisson interpolation or radial basis function interpolation. One of ordinary skill in the art would appreciate that there are numerous types of algorithms that could be used for interpolations, and embodiments of the present invention are contemplated for use with any such algorithm for interpolation.

In addition to or substitution for interpolation, other ways to use operator input delineations to generate a full surface would be to resegment a layer using the delineations as a priori knowledge, for instance by: (i) building a classifier using the delineations as training data and applying that classifier to the non-delineated areas; or (ii) initializing an active surface model at the site of the user delineations and iterating the surface to optimally segment the layer based on the volume data. One of ordinary skill in the art would appreciate that there are numerous methods for resegmenting layers using delineations as a priori knowledge, and embodiments of the present invention are contemplated for use with any appropriate method for such resegmentation.

Figure 6A:
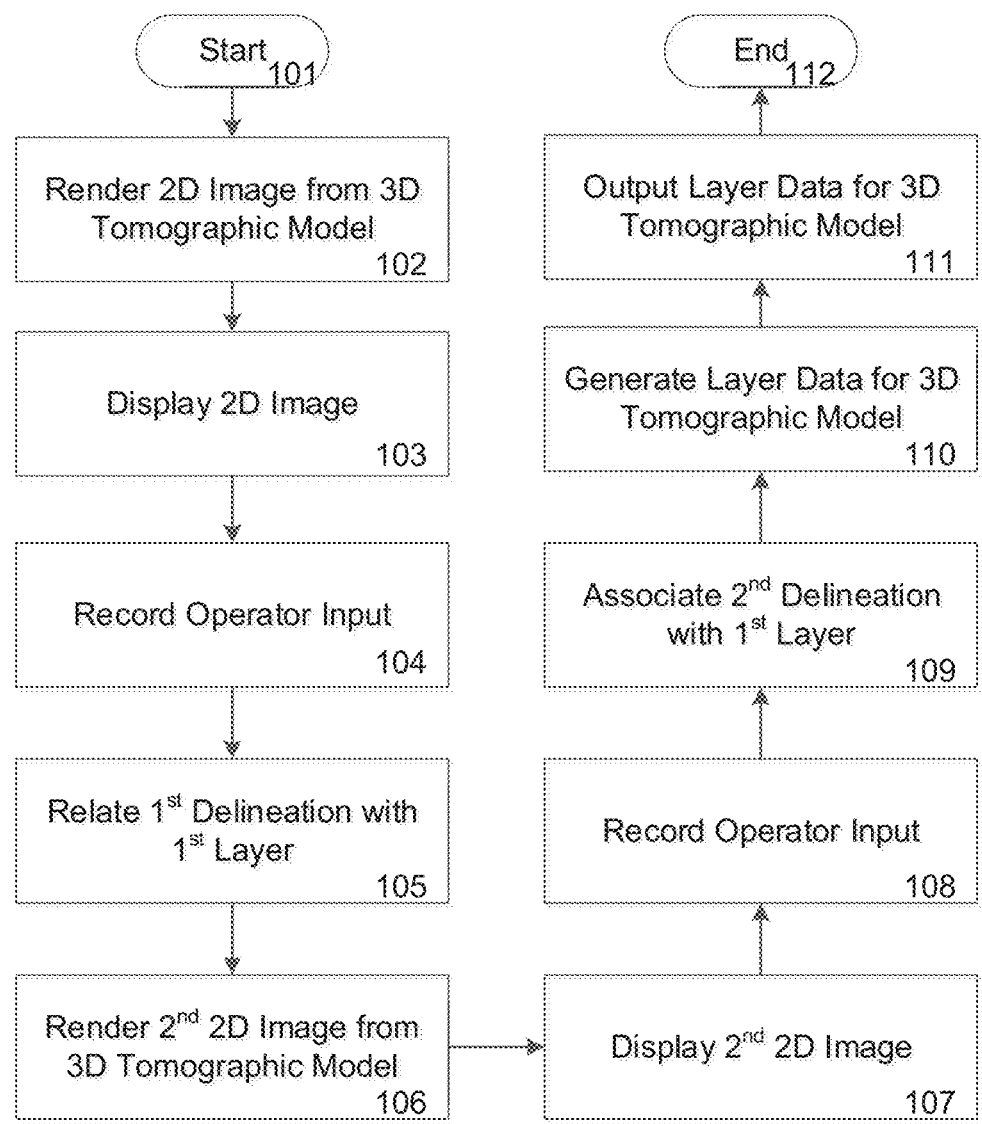
FIG. 6A-6C illustrates an exemplary embodiment of a method for generation or editing of layer delineations, in accordance with an embodiment of the present invention.

Turning now to FIG. 6A, an exemplary method of determining biological layer structure in a three-dimensional (3D) tomography is shown, in accordance with an embodiment of the present invention. The process starts with the system being engaged at step 101. At step 102, the system first renders a first two-dimensional (2D) image produced from a 3D tomographic model. The 3D tomographic model is generally produced via one or more computing devices configured to analyze and process graphical data. In this example, the 3D tomographic model represents a subject (e.g., retina). Being 3D, the tomographic model has 3 axes (e.g., x-axis, a y-axis, a z-axis). Further, in this example, the first 2D image represents a first cross section of the subject. This first cross section is the intersection of the subject and a first surface. The first surface in this example being parallel to the z-axis.

At step 103, the system generates and provides a graphical representation of the first 2D image to an operator. Generally, the graphical representation will be presented to an operator via a display element attached or communicatively connected to a computing device operated by the operator.

At step 104, the system receives input from the operator. Input is generally received by one or more input devices (e.g., keyboard, mouse, capacitive touch screen) attached to or communicatively connected to the computing device operated by the operator. The received input from the operator is a first delineation of one or more layers within the displayed first 2D image. It should be noted that the computing device of the operator may be separate from the computing device processing graphical and data elements associated with the system. In certain embodiments they may be the same computing device, while in others, two or more computing devices can be communicatively connected (e.g., via a communications means utilizing one or more data transmission means, such as wireless networking or wired networking) to provide data back and forth between the computing devices. One of ordinary skill in the art would appreciate that there are numerous configurations that could be utilized with embodiments of the present invention, and embodiments of the present invention are contemplated for use with any appropriate configuration of computing devices.

At step 105, the system relates the first delineation received from the operator input with a first layer of the one or more layers. Relation of the first delineation received from the operator input may be achieved by, for instance, identifying and matching points provided by the operator identifying the first delineation with the first layer.

At step 106, the system renders a second 2D image produced from the 3D tomographic model. In this example, the second 2D image represents a second cross section of the subject, representing an intersection of the subject and a second surface which is either (i) a nonplanar surface parallel to the z-axis, or (ii) a planar surface parallel to the z-axis and not parallel to any plane comprising (a) the z-axis and (b) either the x-axis or the y-axis.

At step 107, the system generates and provides a graphical representation of the second 2D image to the operator for further input.

At step 108, the system receives input from the operator. This input is relating to a second delineation of one or more layers within the displayed second 2D image.

At step 109, the system associates the second delineation with the first layer. Association of the second delineation with the first layer may be achieved by, for instance, identifying and matching points provided by the operator identifying the second delineation with the first layer.

At step 110, the system generates layer data for the 3D tomographic model by interpolating the first and second delineations and finally outputs layer data for the 3D tomographic model at step 111. In certain embodiments, the interpolation could be performed by a procedure that uses the a priori information from the first and second delineations to generate the unknown layer data. One of ordinary skill in the art would appreciate that there are numerous procedures that use a priori information to generate unknown layer data, and embodiments of the present invention are contemplated for use with any appropriate procedure.

Figures 6B, 6C:
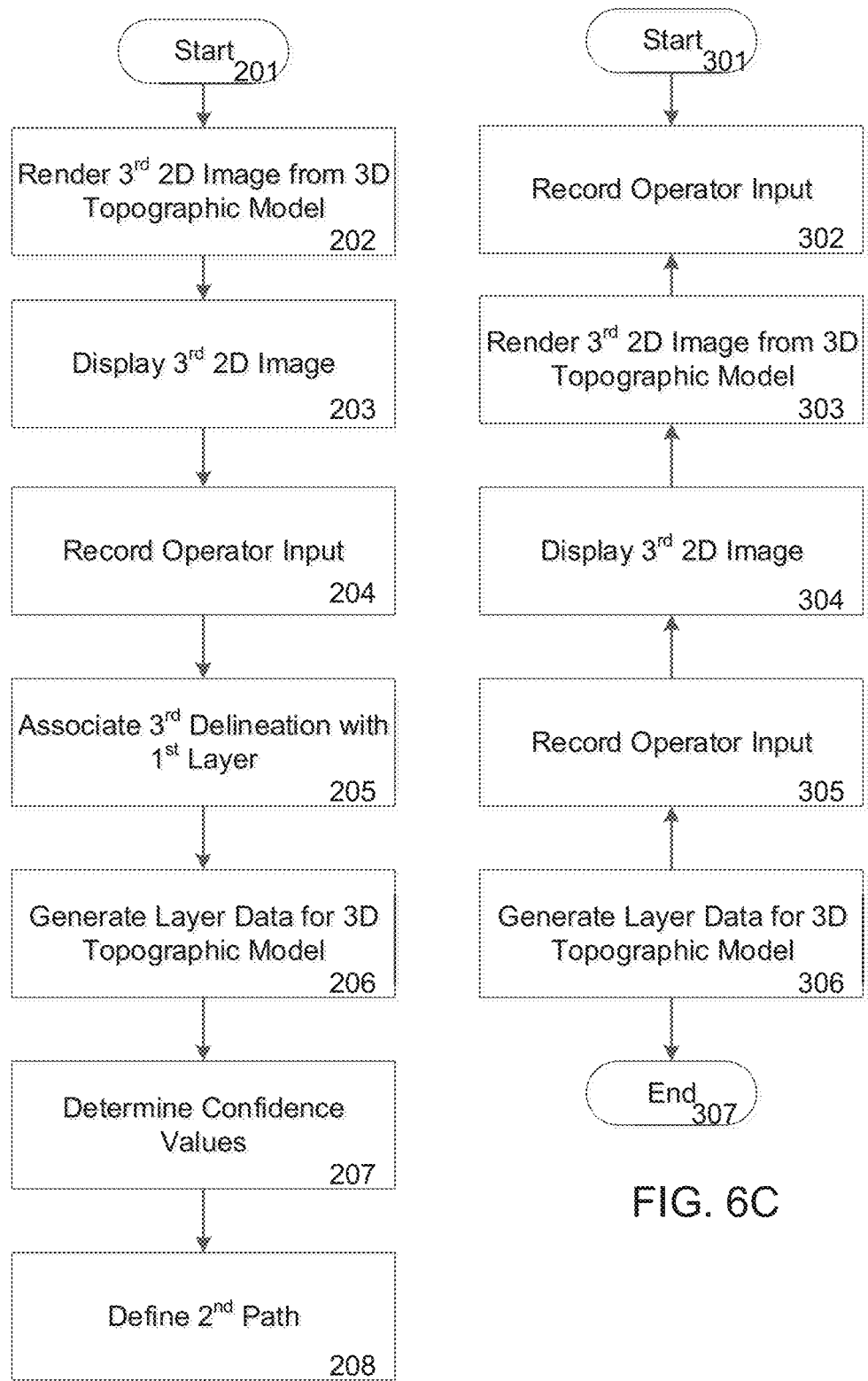

Turning now to FIG. 6B, an exemplary method of determining biological layer structure in a three-dimensional (3D) tomography is shown, in accordance with an embodiment of the present invention. The process starts at step 201, which is a continuation of the exemplary method shown in FIG. 6A. At step 202, the system renders a third 2D image produced from the 3D tomographic model. In this example, the third 2D image represents a third cross section of the subject. The system may also be further configured to compute a third delineation of one or more layers within the displayed third 2D image using the computer.

At step 203, the system displays the third 2D image and the third delineation of layers to the operator. The system then waits for and receives operator input associated with the editing of the third delineation of layers (step 204). After receiving the operator input, the system generates an edited third delineation of layers.

At step 205, the system associates the edited third delineation with the first layer.

At step 206, the system generates layer data for the 3D tomographic model by interpolating the first and second delineations and the edited third delineation. As detailed above, interpolation can be carried out by the system using any number of interpolation algorithms, such as a scattered point interpolation algorithm or a spline interpolation algorithm or could be accomplished through a procedure that uses the a priori information from the first and second delineations to generate the unknown layer data.

At step 207, the system determines a series of confidence values, wherein each confidence value is assigned to a predetermined point in the x-y plane of the subject. The confidence values may be determined in a manner detailed previously herein, such as minimizing the maximum, mean, or total distance from all "low confidence" locations.

At step 208, the system defines a second path in the x-y plane of the subject. In this example, the second path is selected to comprise points in the x-y plane having a mean or minimum confidence value below a target value. At this point, the process terminates at step 209.

Turning now to FIG. 6C, an exemplary method of determining biological layer structure in a three-dimensional (3D) tomography is shown, in accordance with an embodiment of the present invention. The process starts at step 201, which is a continuation of the exemplary method shown in FIG. 6A. At step 302, the system receives operator input defining a second path in the x-y plane of the subject.

At step 303, the system renders a third 2D image produced from the 3D tomographic model using the computer. In this example, the third 2D image represents a third cross section of the subject. The third cross section is the intersection of the subject and a third surface, and the third surface consists of each line parallel to the z-axis of the subject and passing through the second path in the x-y plane of the subject.

At step 304, the system generates and provides display data for provision to the operator, wherein the display presented to the operator is the third 2D image.

At step 305, the system receives operator input of a third delineation of one or more layers within the displayed third 2D image. The system then associates the third delineation with the first layer.

Finally, at step 306, the system generates layer data for the 3D tomographic model by interpolating the first, second and third delineations using the computer. As detailed above, interpolation can be carried out by the system using any number of interpolation algorithms, such as a scattered point interpolation algorithm or a spline interpolation algorithm. As detailed above, interpolation can be carried out by the system using any number of interpolation algorithms, such as a scattered point interpolation algorithm or a spline interpolation algorithm or could be accomplished through a procedure that uses the a priori information from the first and second delineations to generate the unknown layer data. The process then terminates at step 307.

Figure 7:
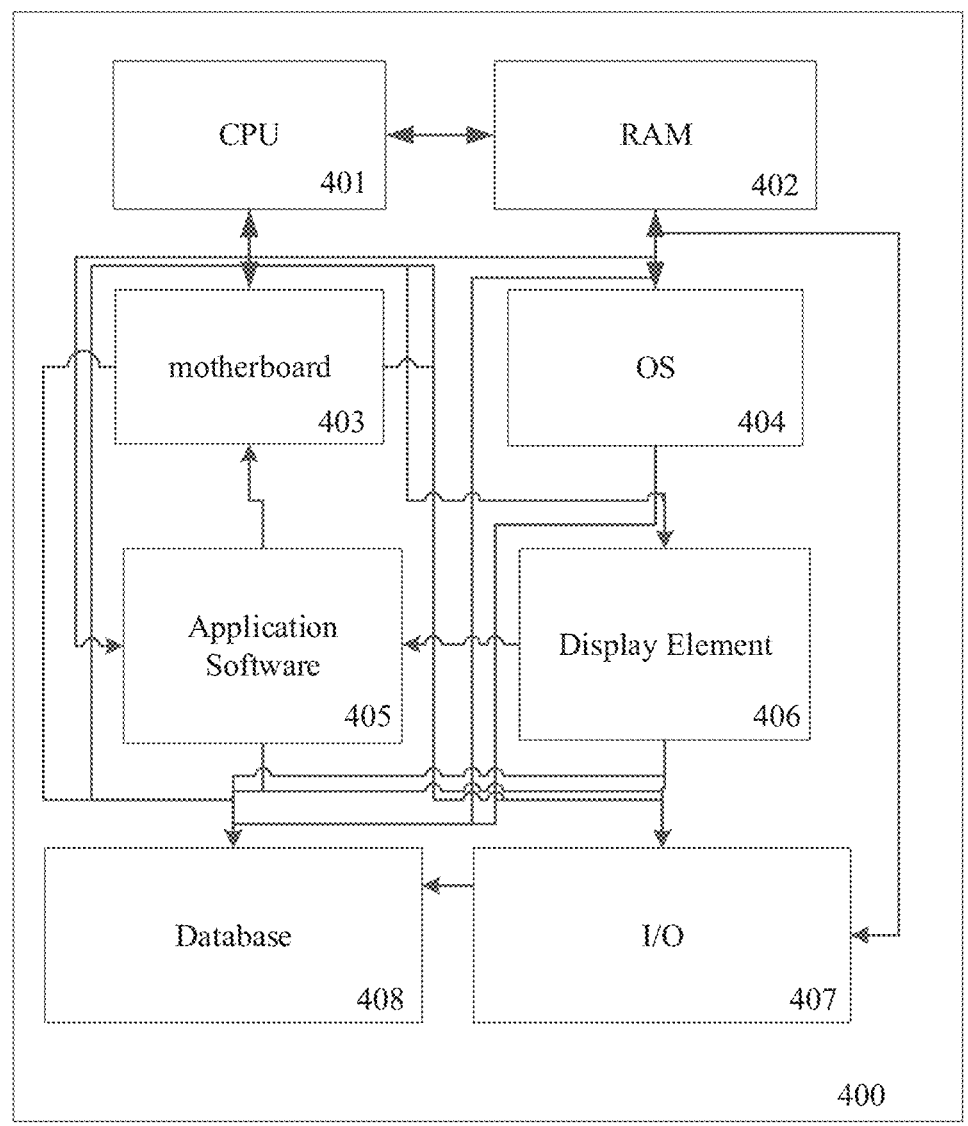
FIG. 7 illustrates a schematic overview of a computing device, in accordance with an embodiment of the present invention.

According to an embodiment of the present invention, the system and method may be configured to process and communicate data to and may be used in conjunction or through the use of one or more computing devices. As shown in FIG. 7, One of ordinary skill in the art would appreciate that a computing device 400 appropriate for use with embodiments of the present application may generally be comprised of one or more of a Central processing Unit (CPU) 401, Random Access Memory (RAM) 402, a storage medium (e.g., hard disk drive, solid state drive, flash memory, cloud storage) 403, an operating system (OS) 404, one or more application software 405, one or more display elements 406, one or more input/output devices/means 407 and one or more databases 408. Examples of computing devices usable with embodiments of the present invention include, but are not limited to, personal computers, smartphones, laptops, mobile computing devices, tablet PCs and servers. Certain computing devices configured for use with the system do not need all the components described in FIG. 7. For instance, a server may not necessarily include a display element. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 8:
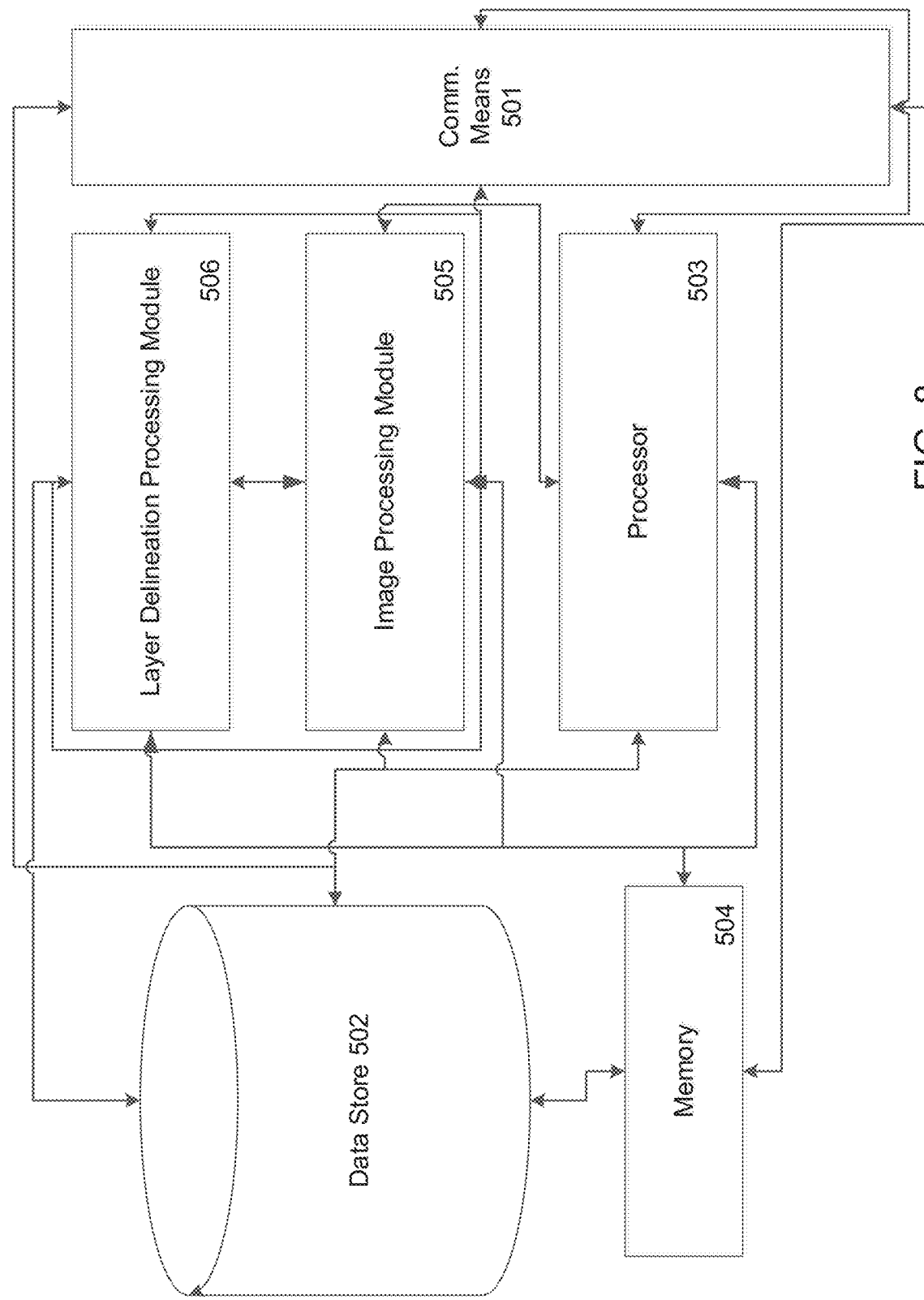
FIG. 8 illustrates a schematic overview of an embodiment of a system for generation or editing of layer delineations.
Figure 9:
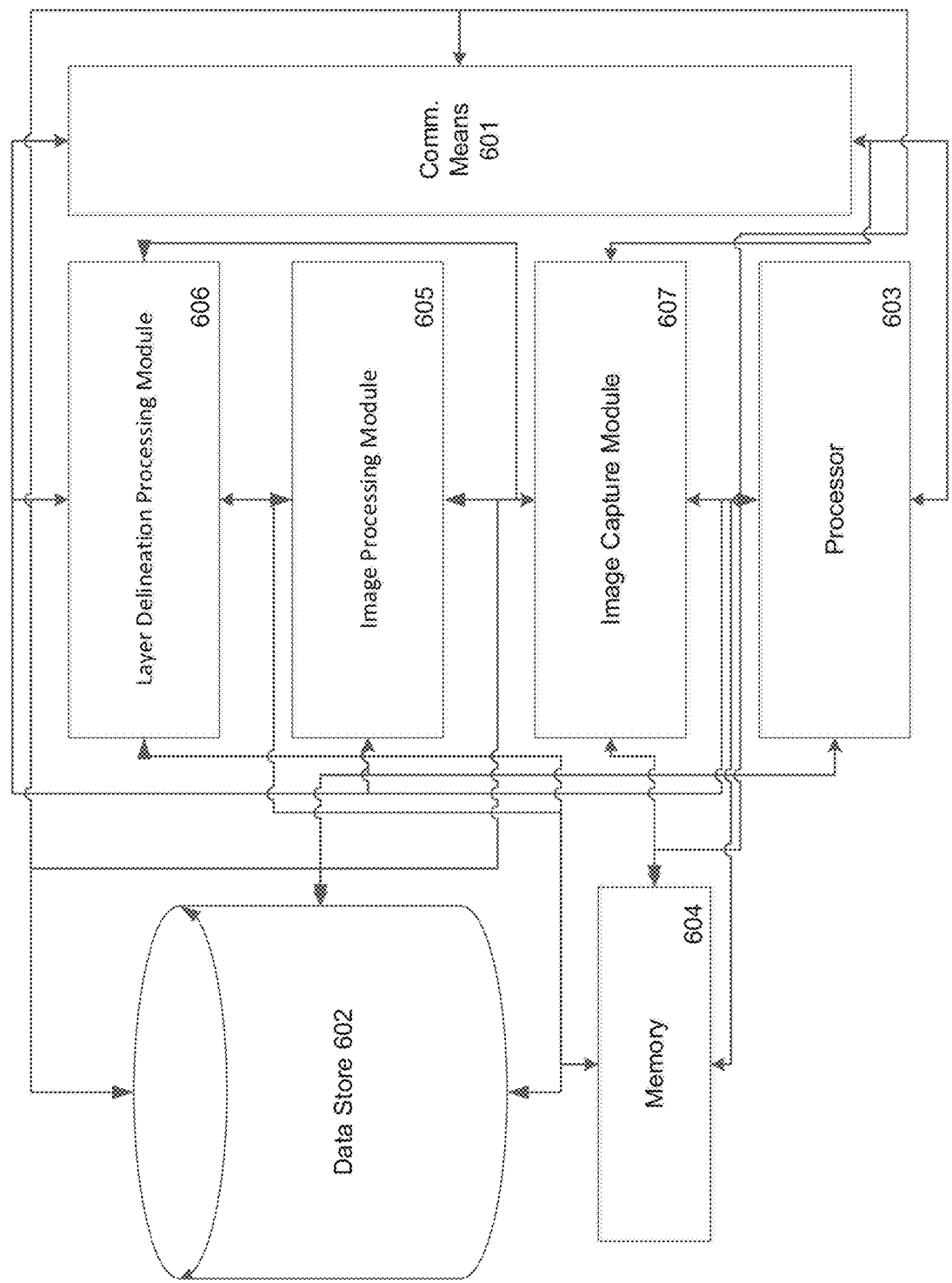
FIG. 9 illustrates a schematic overview of an embodiment of a system for generation or editing of layer delineations.

Turning to FIG. 8, according to an embodiment of the present invention, a system for generation or editing of layer delineations is comprised of one or more communications means 501, one or more data stores 502, a processor 503, memory 504, an image processing module 505 and layer delineation processing module 506. FIG. 9 shows an alternative embodiment of the present invention, comprised of one or more communications means 601, one or more data stores 602, a processor 603, memory 604, an image processing module 605, a layer delineation processing module 606 and an image capture module 607. The various modules described herein provide functionality to the system, but the features described and functionality provided may be distributed in any number of modules, depending on various implementation strategies. One of ordinary skill in the art would appreciate that the system may be operable with any number of modules, depending on implementation, and embodiments of the present invention are contemplated for use with any such division or combination of modules as required by any particular implementation. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data over one or more networks or to one or more peripheral devices attached to the system. Appropriate communications means may include, but are not limited to, wireless connections, wired connections, cellular connections, data port connections, Bluetooth® connections, or any combination thereof. One of ordinary skill in the art would appreciate that there are numerous communications means that may be utilized with embodiments of the present invention, and embodiments of the present invention are contemplated for use with any communications means.

According to an embodiment of the present invention, the layer delineation processing module is configured to process the various delineations between layers as detailed herein. In a preferred embodiment, the layer delineation processing module is configured to provide a fully automated segmentation algorithm (e.g., retinal layer segmentation). In other embodiments, the layer delineation processing module is configured to work in conjunction with operator provided input to provide a semi-automated segmentation process.

According to an embodiment of the present invention, the image processing module works in conjunction with the layer delineation processing module and is configured to render 2D and 3D images and generate display data for consumption by the operator. Generation, processing and rendering means and methods utilized by the image processing module are detailed previously herein. Further, one of ordinary skill in the art would appreciate that there are numerous methods for processing 2D and 3D images and generating display data, and embodiments of the present invention are contemplated for use with any appropriate means for processing and generating such data.

According to an embodiment of the present invention, the Image capture module is configured to capture image data to be used in generation of the 2D and 3D images used by other components of the system. For instance, the Image capture module could be configured to receive input from a imaging device (e.g., 2D or 3D imaging device, CT scanner, MRI scanner, optical coherence tomography scanner) and process such input into a subject for use in the methods detailed herein.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on —any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A method of determining biological layer structure in a three-dimensional (3D) tomography scan comprising:
    rendering a first two-dimensional (2D) image produced from a 3D tomographic model using a computer, wherein the 3D tomographic model represents a subject, wherein the subject has an x-axis, a y-axis, a z-axis, wherein the first 2D image represents a first cross section of the subject, and wherein the first cross section is the intersection of the subject and a first surface, wherein the first surface is parallel to the z-axis;

displaying, the first 2D image using, the computer;

recording operator input of a first delineation of one or more layers within the displayed first 2D image using the computer;

relating the first delineation with a first layer of the one or more layers using the computer;

rendering a second 2D image produced from the 3D tomographic model using the computer, wherein the second 2D image represents a second cross section of the subject, and wherein the second cross-section is the intersection of the subject and a second surface, wherein the second surface is either (i) a nonplanar surface, wherein the nonplanar surface is parallel to the z-axis, or (ii) a planar surface, wherein the planar surface is parallel to the z-axis, and wherein the planar surface is not parallel to any plane comprising (a) the z-axis and (b) either the x-axis axis or the y axis;

displaying the second 2D image using the computer;

recording operator input of a second delineation of one or more layers within the displayed second 2D image using the computer;

associating the second delineation with the first layer using the computer;

generating layer data for the 3D tomographic model by interpolating the first and second delineations using the computer;

outputting the layer data for the 3D tomographic model using the computer;

wherein the second surface is the nonplanar surface, wherein the nonplanar surface consists of each line parallel to the z-axis of the subject and passing through a first path in an x-y plane of the subject, wherein the x-y plane of the subject comprises the x-axis and the y-axis of the subject;

rendering a third 2D image produced from the 3D tomographic model using the computer, wherein the third 2D image represents a third cross section of the subject, wherein the third cross section is the intersection of the subject and a third surface, and wherein the third surface consists of each line parallel to the z-axis of the subject and passing through a second path in the x-y plane of the subject;

displaying the third 2D image using the computer;

recording operator input of a third delineation of one or more layers within the displayed third 2D image using the computer;

associating the third delineation with the first layer using the computer; and generating layer data for the 3D tomographic model by interpolating the first, second, and third delineations using the computer.

2. The method of claim 1, further comprising:

determining a series of confidence values using the computer, wherein each confidence value is assigned to a predetermined point in the x-y plane of the subject; and defining the second path in the x-y plane of the subject using the computer, wherein the second path is selected to comprise points in the x-y plane having a mean or minimum confidence value below a target value.

3. The method of claim 2, wherein the confidence value assigned to each predetermined point is a function of the minimum distance between the predetermined point and the first or second cross section.

4. The method of claim 2, wherein the confidence value assigned to each predetermined point is a function of the output of an edge detection algorithm comparing data from the 3D tomographic model at that predetermined point with data from the 3D tomographic model at an adjacent predetermined point.

5. The method of claim 2, further comprising:

collecting operator input labeling zero, one, or more regions in the x-y plane of the subject as desired using the computer; and collecting operator input using the computer labeling zero, one, or more regions in the x-y plane of the subject as undesired using the computer; and wherein the second path is selected to consist of points within any regions labeled as desired, or the second path is selected to consist of points outside any regions labeled as undesired.

6. The method of claim 1, wherein the second path traces a spiral shape.

7. The method of claim 1, wherein the second path traces a multi-arm star shape.

8. A method of determining biological layer structure in a three-dimensional (3D) tomography scan comprising:

rendering a first two-dimensional (2D) image produced from a 3D tomographic model using a computer, wherein the 3D tomographic model represents a subject, wherein the subject has an x-axis, a y-axis, a z-axis, wherein the first 2D image represents a first cross section of the subject, and wherein the first cross section is the intersection of the subject and a first surface, wherein the first surface is parallel to the z-axis:

displaying the first 2D image using the computer;

recording operator input of a first delineation of one or more layers within the displayed first 2D image using the computer;

relating the first delineation with a first layer of the one or more layers using the computer;

rendering a second 2D image produced from the 3D tomographic model using the computer, wherein the second 2D image represents a second cross section of the subject, and wherein the second cross-section is the intersection of the subject and a second surface, wherein the second surface is either (i) a nonplanar surface, wherein the nonplanar surface is parallel to the z-axis, or (ii) a planar surface, wherein the planar surface is parallel to the z-axis, and wherein the planar surface is not parallel to any plane comprising (a) the z-axis and (b) either the x-axis or the y-axis;

displaying the second 2D image using the computer;

recording operator input of a second delineation of one or more layers within the displayed second 2D image using the computer;

associating the second delineation with the first layer using the computer;

generating layer data for the 3D tomographic model by interpolating the first and second delineations using the computer;

outputting the layer data for the 3D tomographic model using the computer;

wherein the second surface is the nonplanar surface, wherein the nonplanar surface consists of each line parallel to the z-axis of the subject and passing through a first path in an x-y plane of the subject, wherein the x-y plane of the subject comprises the x-axis and the y-axis of the subject;

accepting operator input defining a second path in the x-y plane of the subject using the computer;

rendering a third 2D image produced from the 3D tomographic model using the computer, wherein the third 2D image represents a third cross section of the subject, wherein the third cross section is the intersection of the subject and a third surface, and wherein the third surface consists of each line parallel to the z-axis of the subject and passing through the second path in the x-y plane of the subject;

displaying the third 2D image using the computer;

recording operator input of a third delineation of one or more layers within the displayed third 2D image using the computer;

associating the third delineation with the first layer using the computer; and generating layer data for the 3D tomographic model by interpolating the first, second and third delineations using the computer.

9. The method of claim 8, wherein the second path traces a spiral shape.

10. The method of claim 8, wherein the second path traces a multi-arm star shape.

11. A method of determining biological layer structure in a three-dimensional (3D) tomography scan comprising:

rendering a first two-dimensional (2D) image produced from a 3D tomographic model using a computer, wherein the 3D tomographic model represents a subject, wherein the subject has an x-axis, a y-axis, a z-axis, wherein the first 2D image represents a first cross section of the subject and wherein the first cross section is the intersection of the subject and a first surface, wherein the first surface is parallel to the z-axis;

displaying the first 2D image using the computer;

recording operator input of a first delineation of one or more layers within the displayed first 2D image using the computer;

relating the first delineation with a first layer of the one or more layers using the computer;

rendering a second 2D image produced from the 3D tomographic model using the computer, wherein the second 2D image represents a second cross section of the subject, and wherein the second cross-section is the intersection of the subject and a second surface, wherein the second surface is either (i) a nonplanar surface, wherein the nonplanar surface is parallel to the z-axis, or (ii) a planar surface, wherein the planar surface is parallel to the z-axis, and wherein the planar surface is not parallel to any plane comprising (a) the z-axis and (b) either the x-axis or the y-axis;

displaying the second 2D image using the computer;

recording operator input of a second delineation of one or more layers within the displayed second 2D image using the computer;

associating the second delineation with the first layer using the computer;

generating layer data for the 3D tomographic model by interpolating the first and second delineations using the computer;

outputting the layer data for the 3D tomographic model using the computer;

wherein the second surface is the nonplanar surface, wherein the nonplanar surface consists of each line parallel to the z-axis of the subject and passing through a first path in an x-y plane of the subject wherein the x-y plane of the subject comprises the x-axis and the y-axis of the subject;

accepting operator input defining a point-of-interest in the x-y plane of the subject using the computer;

defining a second path in the x-y plane of the subject using the computer, wherein the second path is selected to comprise and center about the point-of-interest;

rendering a third 2D image produced from the 3D tomographic model using the computer, wherein the third 2D image represents a third cross section of the subject, wherein the third cross section is the intersection of the subject and a third surface, and wherein the third surface consists of each line parallel to the z-axis of the subject and passing through the second path in the x-y plane of the subject;

displaying the third 2D image using the computer;

recording operator input of a third delineation of one or more layers within the displayed third 2D image using the computer;

associating the third delineation with the first layer using the computer; and generating layer data for the 3D tomographic model by interpolating the first, second, and third delineations using the computer.

12. The method of claim 11, wherein the second path traces a spiral shape.

13. The method of claim 11, wherein the second path traces a multi-arm star shape.

\* \* \* \* \*